United States Patent [19]

Cossin

[11] Patent Number: 4,566,213

[45] Date of Patent: Jan. 28, 1986

[54] FISH LINE KNOT TYING JIG

[76] Inventor: George E. Cossin, 627 E. Oleander Cir., Barefoot Bay, Fla. 32958

[21] Appl. No.: 607,215

[22] Filed: May 4, 1984

[51] Int. Cl.⁴ ............................................. A01K 91/04
[52] U.S. Cl. ................................................ 43/1; 43/4; 289/17
[58] Field of Search ........................... 43/1, 4; 289/17; 269/254 CS, 3, 6

[56] References Cited

U.S. PATENT DOCUMENTS

| 1,592,365 | 7/1926 | Houskeeper | 269/254 CS |
| 1,892,647 | 12/1932 | Bahelka | 269/254 CS |
| 2,758,858 | 8/1956 | Smith | 43/1 |
| 2,819,377 | 5/1943 | Wallace | 269/254 CS |
| 3,106,417 | 10/1963 | Clow | 289/17 |
| 3,252,724 | 5/1966 | Kearns | 289/17 |
| 4,315,445 | 2/1982 | Catron | 43/1 |

FOREIGN PATENT DOCUMENTS

| 989903 | 5/1976 | Canada | 43/4 |
| 749874 | 5/1933 | France | 269/254 CS |

Primary Examiner—Gene P. Crosby

[57] ABSTRACT

A hand held jig for holding fishing tackle lures and hooks securely while affixing a resilient line thereto. A body of suitable material has a fixed jaw at one end and a handle at the other end and a laterally movable jaw parallel to the fixed jaw in co-operation therewith for holding the fishing gear.

2 Claims, 3 Drawing Figures

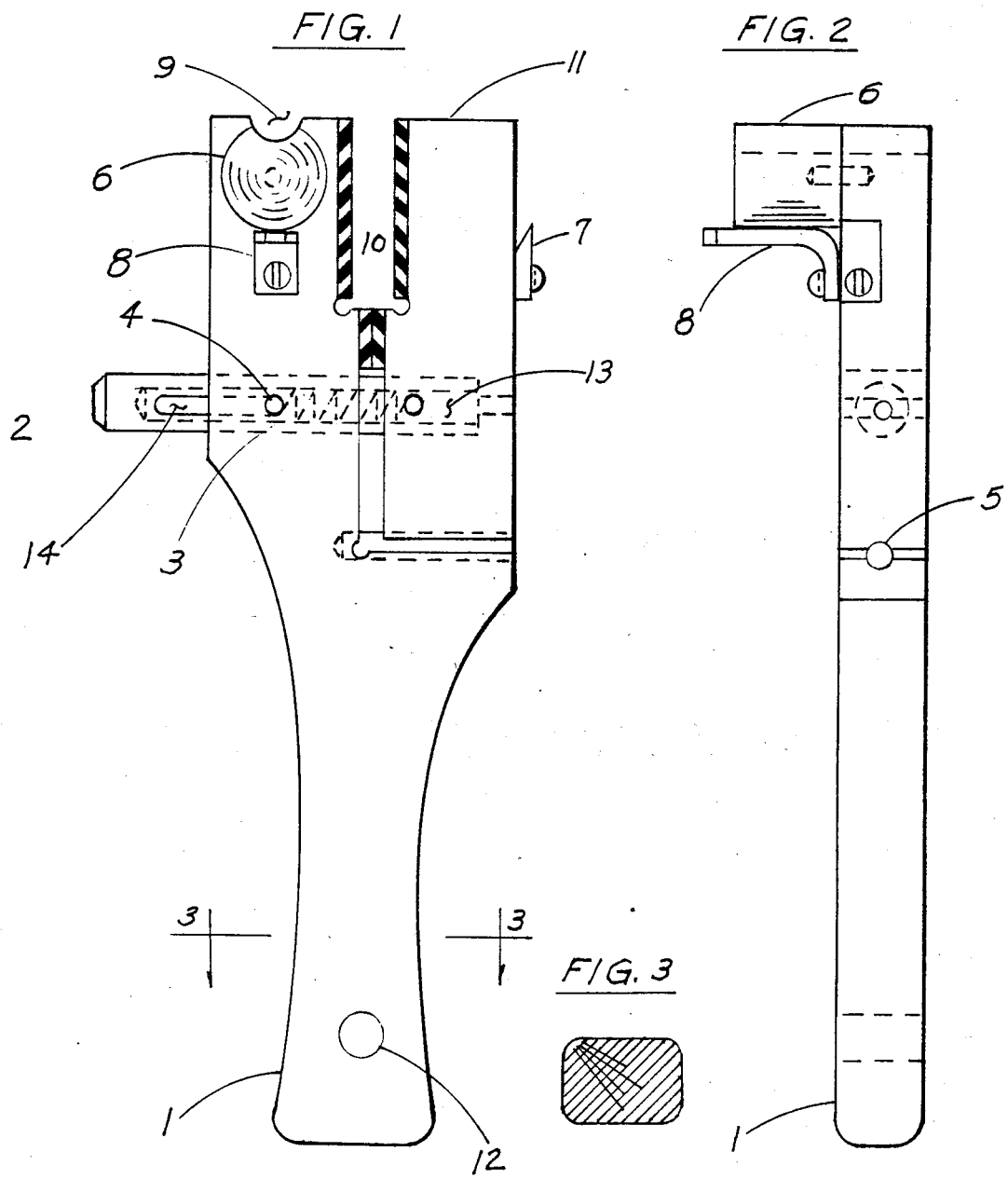

FISH LINE KNOT TYING JIG

BACKGROUND OF THE INVENTION

Heretofore it has been the practice of affixing a line to any fishing gear by holding the item to be tied in one hand and the line in the other, then making the tie with the sharp barbs and hooks exposed. This fixture will eliminate the potential of an accidental wound by the exposed sharp hooks. The item to be tied will be held securely under the protective jaws of the fixture with only the loop that receives the line exposed. This make the operation safer and promotes a neat securely tied knot much faster than the conventional manual method.

BRIEF SUMMARY OF THE INVENTION

My invention comprises a fixture that is light in weight, made of durable hard wood and is buoyant if dropped in the water. The design and operation promotes safety in handling and operating while making the connection to the item being tied, even under the most inclement weather conditions or other adverse circumstances.

BRIEF DESCRIPTION OF THE DRAWING

FIG. 1 is a plan view of the fixture.

FIG. 2 is a side elevation showing the narrow body thickness, handle and height of the anchor post.

FIG. 3 is a cross section of the handle.

OPERATING DESCRIPTION OF THE JIG

As shown in the drawing FIG. 1 an embodiment of my invention includes a jig with a body 1 of suitable material having a fixed jaw at one end and a handle at the other end; a laterally movable jaw 11 parallel to the fixed jaw of body 1 in co-operation therewith for holding fishing gear for use in affixing a line thereto. The hollow area 13 inside the plunger rod 2 provides space for tension spring 3 which is anchored to dowell pins 4 and movable jaw 11, which is slidable guided within said body 1. The tension spring 3 exerts the pressure on movable jaw 11 to hold fishing gear in place for tying a line thereto. The facing 10 on holding jaws may be applied material to suit. Anchor post 6 is mounted on the fixed jaw of body 1 and extending perpendicularly thereto. Anchor post 6 has a relief groove 9 on one side, whereby a line may be inserted in the groove 9 for an equal number of turns around the horizontal lines passing over groove 9. The line remains secure to the fishing gear while it is lifted up and pulled away from the jig. The line then may be tightened snugly and trimmed to suit thereby completing the operation.

The jig may be held in the palm of the hand with the fingers wrapped around the side of the jig with the thumb tip on plunger rod 2. Depressing plunger rod 2 will cause movable jaw 11 to receed, providing space between the fixed jaw of body 1 and movable jaw 11. The item to be tied may be placed between the jaws with the tying eye of the fishing gear facing upward when the thumb pressure on plunger rod 2 is released the movable jaw 11 will receed and lock the item to be tied between the jaws. Approximately eight inches of surplus line is provided for affixing to the item to be tied. The tag end of the line is placed under pressure pad 7 along with finger pressure on pad 7 to keep the line taut. The line is fed through the eye of the fishing gear between pressure pad 8 and anchor post 6, proceeding around anchor post 6 across relief groove 9 over and through the eye of the fishing gear repeating until four complete turns are made around anchor post 6. The line is then inserted in groove 9 and wrapped around the resulting horizontal lines the same number of turns. Both ends of the line may now be pulled up and away from the jig while pulling the line snugly around the eye of the fishing gear. The surplus line may now be trimmed to suit.

I claim:

1. A line Knot Tying Jig comprising, a body having a fixed jaw at one end and a handle at the other end; a laterally movable jaw parallel to said fixed jaw, and in co-operation therewith for holding fishing gear for use in affixing a resilient line thereto; a hollow plunger rod secured to said movable jaw and slidably guided within said body; spring means in said plunger rod operatively biasing said movable jaw toward the fixed jaw to hold said fishing gear; an anchor post mounted on said fixed jaw and extending perpendicularly thereto, said anchor post having a relief groove in one side, whereby a line can be secured to the fishing gear held between the jaws and a knot tied by wrapping the line in relation to the anchor post and relief groove.

2. A line Knot Tying Jig as stated in claim 1, said jig may be hand held or securely mounted by means of anchoring the jig by it's handle, the jaws of the jig having an applied material face, the jig being made of suitable material for flotation purpose, being light in weight and is a comfortable size.

* * * * *